March 28, 1961 S. G. LUTZ ET AL 2,977,543

RECOGNITION CIRCUIT FOR PULSE CODE COMMUNICATION SYSTEMS THAT PROVIDES FOR VARIABLE REPETITION RATES BETWEEN PULSES

Filed March 8, 1955 3 Sheets-Sheet 1

INVENTORS
SAMUEL G. LUTZ,
JOHN E. TABER
BY Henry Heyman
ATTORNEY.

March 28, 1961 S. G. LUTZ ET AL 2,977,543

RECOGNITION CIRCUIT FOR PULSE CODE COMMUNICATION SYSTEMS THAT PROVIDES FOR VARIABLE REPETITION RATES BETWEEN PULSES

Filed March 8, 1955 3 Sheets-Sheet 2

INVENTORS
SAMUEL G. LUTZ,
JOHN E. TABER
BY Henry Heyman
ATTORNEY.

INVENTORS
SAMUEL G. LUTZ,
JOHN E. TABER
BY Henry Heyman
ATTORNEY.

2,977,543

RECOGNITION CIRCUIT FOR PULSE CODE COMMUNICATION SYSTEMS THAT PROVIDES FOR VARIABLE REPETITION RATES BETWEEN PULSES

Samuel G. Lutz, Los Angeles, and John E. Taber, Gardena, Calif., assignors to Hughes Aircraft Company, Culver City, Calif., a corporation of Delaware Filed Mar. 8, 1955, Ser. No. 492,933

8 Claims. (Cl. 328—110)

The present invention relates to pulse code communication systems and more particularly to a recognition circuit for such a system that will operate in spite of deviations in the time spacing between the individual pulses of the signal to be recognized from that of a predetermined time spacing.

In copending U.S. patent application, Serial No. 448,363 by John E. Taber, for A Recognition Circuit for Pulse Code Communication Systems, filed on August 6, 1954, there is disclosed and claimed a recognition circuit that may be utilized in conjunction with high-speed pulse code communication systems requiring the use of message recording equipment. As stated therein, messages may be so brief and transmitted so infrequently that continuous recording under such low duty-cycle conditions would be economically impracticable. Accordingly, the recording equipment at the receiver is normally maintained inoperable or in standby readiness, and the receiver is provided with a recognition circuit for starting the recording equipment in the event a desired message is received. The recognition circuit is preferably connected between the communications receiver and the recording equipment and is responsive to an identifying or recognition signal prefixed to the transmitted message for rendering the recording equipment operable.

One type of signal suitable for purposes of recognition is that in which pulses are repeated at predetermined intervals of time which are preferably made identical to the intervals of time between message pulse positions. In this way, if the prefixed recognition signals are not received, because of interference, fading, or other initial interruption of an otherwise good signal, the recognition circuit will nevertheless be responsive to the message text pulses for starting the recording equipment.

According to the basic concept of the invention described in the copending application, a received identifying signal is represented by first and second groups of pulses which are combined to produce a composite signal having a positive portion and a negative portion lagging the positive portion by an interval of time equal to a pulse duration. The amplitudes of the positive and negative portions correspond to the sums of the amplitudes of the first and second groups of pulses, respectively, multiplied by a first proportionality factor. The composite signal is then applied to a threshold device biased to a voltage level equal to the product of a second proportionality factor, smaller than the first proportionality factor and the product of the amplitude and a predetermined minimum number of pulses of the first group of pulses.

More particularly, according to an embodiment of the above mentioned invention, $m$ time-spaced groups of $n$ time-spaced pulses of equal amplitude and duration are applied to an alignment circuit, the time interval between pulses of one group being equal to the time interval between corresponding pulses in any other group and the time interval between corresponding pulses of any two groups being equal to the time interval between any other corresponding pulses of the two groups. The alignment circuit superimposes corresponding pulses of the $m$ applied groups of pulses to produce a single group of $n$ time-spaced pulses of substantially equal amplitude and duration and representing a recognition signal. This latter group of $n$ time-spaced pulses is applied to a tapped delay line network comprising $(2n-1)$ delay line sections connected in tandem. The delay line network delays each of the $n$ applied pulses to simultaneously produce a group of $n$ pulses at first and second instants of time, the second instant lagging the first instant by an interval of time equal to a pulse duration. Each group of $n$ pulses is linearly added to produce first and second output signals, the amplitude of each output signal being equal to the instantaneous sum of the amplitudes of the $n$ pulses multiplied by a reduction factor. The first and second output signals are then applied to the first and second input terminals, respectively, of a difference network which, in response thereto, produces a composite signal equal in amplitude to the instantaneous difference between the amplitudes of the first and second output signals multiplied by an amplification factor. Recognition is indicated by applying the composite signal to a threshold device which is biased to a voltage level less than the product of the reduction factor, the amplification factor, the amplitude of the pulses and a predetermined minimum number of pulses of the $n$ applied pulses.

An undesirable limitation of the recognition circuit described in the copending application is that, in order to obtain recognition, the time spacing between the individual pulses of the group of pulses applied to the delay line network must be confined, within very narrow limits, to a predetermined time spacing. This limitation results from the fact that the individual delay line sections of the $(2n-1)$ delay line sections have fixed time delays corresponding to the predetermined time spacing between the individual pulses. As a result, relatively slight deviations in the time spacing between the individual pulses applied to the delay line network, caused by variations in the rate of message transmission, from that desired for recognition will prevent recognition. Furthermore, the recognition circuit is inherently not adapted to indicate the extent of any deviation nor whether the deviation is positive or negative with respect to the predetermined time spacing between pulses.

It is, therefore, an object of the present invention to provide a recognition circuit for pulse code communication systems that produces an output pulse in response to at least a predetermined minimum number of pulses of $n$ applied pulses.

It is another object of the present invention to provide a recognition circuit for pulse code communication systems that produces an output pulse in response to signals to be recognized despite deviations in the time spacing between the individual pulses of the signals from that of a predetermined time spacing between individual pulses.

It is a further object of the present invention to provide a recognition circuit for pulse code communication systems that may be utilized to indicate the extent of the deviation in the time spacing between the individual pulses of a recognition signal from that of a predetermined time spacing between pulses and whether the deviation is positive or negative with respect to the predetermined time spacing.

The present invention overcomes the above and other limitations of the recognition circuit of the copending application by providing a recognition circuit that produces an output recognition pulse in response to signals to be recognized despite deviations in the time spacing between the individual pulses of the signals from that of a predetermined time spacing between individual pulses. According to the basic concept of the present invention, a received identifying signal is represented by a group of pulses simultaneously produced at an instant of time, a group of pulses having the predetermined time spacing between individual pulses being simultaneously produced at a first instant of time and a group of pulses having other than the predetermined time spacing between individual pulses being simultaneously produced at another instant of time, the time interval between said other and said first instants of time corresponding to the product of the time interval between the first and last pulses of the group of pulses and the percentage deviation of the time spacing between individual pulses from that of the predetermined time spacing between the individual pulses.

The simultaneously produced group of pulses is combined to produce a composite pulse whose amplitude corresponds to the sum of the amplitudes of the group of pulses multiplied by a reduction factor. The composite pulse is then applied to a threshold device which produces an output recognition pulse in response to the composite pulse exceeding a predetermined voltage level, the voltage level being a predetermined amount below the amplitude of the composite pulse produced in response to a predetermined minimum number of pulses of the representative group of pulses.

More particularly, according to an embodiment of the present invention, a group of $n$ time-spaced pulses of substantially equal amplitude and duration and representing an identifying signal is applied to a delay line having a plurality of sets of $n$ output taps. The delay line delays each of the $n$ applied pulses to simultaneously produce a group of $n$ pulses at one of the sets of $n$ output taps, one tap to a pulse, the $n$ output taps of one set being spaced from each other to simultaneously produce the $n$ delayed pulses having the predetermined time spacing between individual pulses and the $n$ output taps of each one of the other sets being spaced from each other to simultaneously produce the $n$ delayed pulses deviating in the time spacing between individual pulses from the predetermined time spacing. The simultaneously produced group of $n$ pulses is linearly added to produce a composite pulse whose amplitude is equal to the instantaneous sum of the amplitudes of the $n$ pulses multiplied by a reduction factor. Recognition is indicated by applying the composite pulse to a threshold device which is biased to a voltage level less than the product of the reduction factor, the amplitude of a pulse and a predetermined minimum number of pulses of the $n$ applied pulses. More specifically, the threshold device is responsive to that portion of the composite pulse exceeding the voltage level to produce an output recognition pulse.

One of the most desirable features of the present invention is that recognition will occur even though the time spacing between the individual pulses of the group of $n$ time-spaced pulses applied to the delay line may deviate from a predetermined time spacing between pulses. This result is brought about by the fact that the delay line includes a plurality of sets of $n$ output taps, the sets being displaced from each other in such a manner that the $n$ time-spaced pulses applied to the delay line are simultaneously produced at one of the sets of taps irrespective of slight deviations in the time spacing between them.

Another attractive feature of the present invention is that a fairly accurate indication may be obtained of the extent of any deviation and whether the deviation is positive or negative with respect to the predetermined time spacing between pulses. Such a result can be achieved by coupling an indicator circuit between each set of output taps and the threshold device, as will be explained more fully below.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the elements of the invention.

Figure 1:
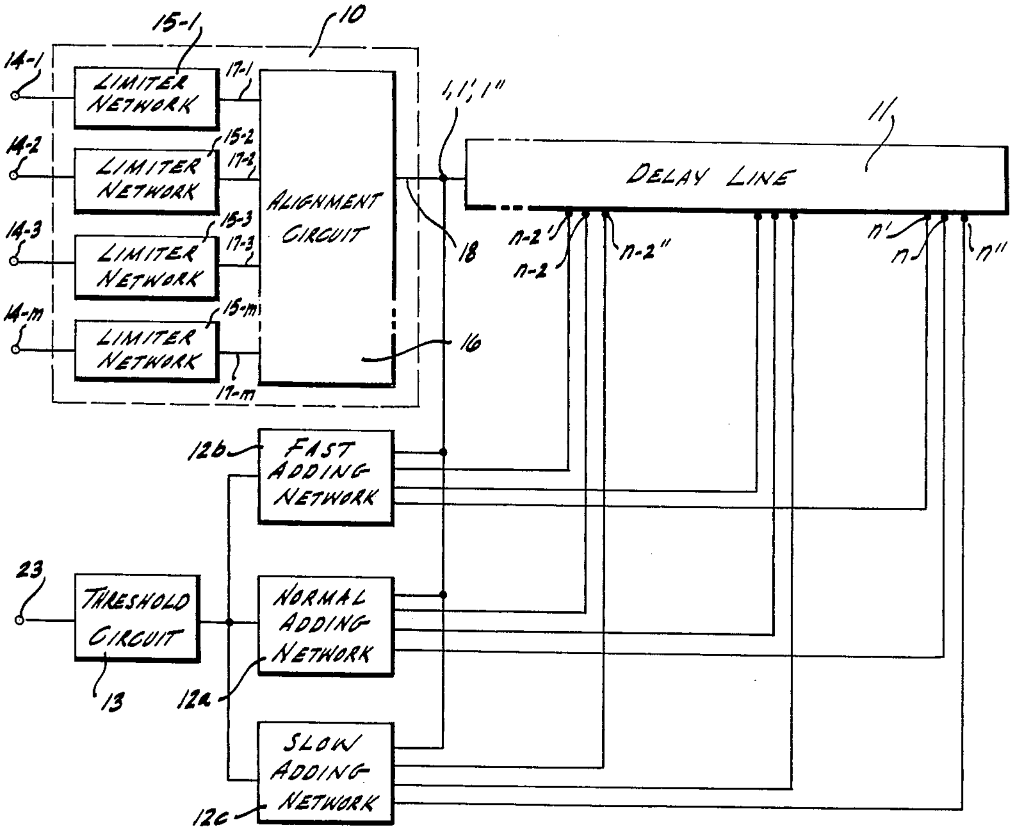
Fig. 1 is a block diagram of an embodiment of a recognition circuit for pulse code communication systems according to the present invention.
Figure 4:
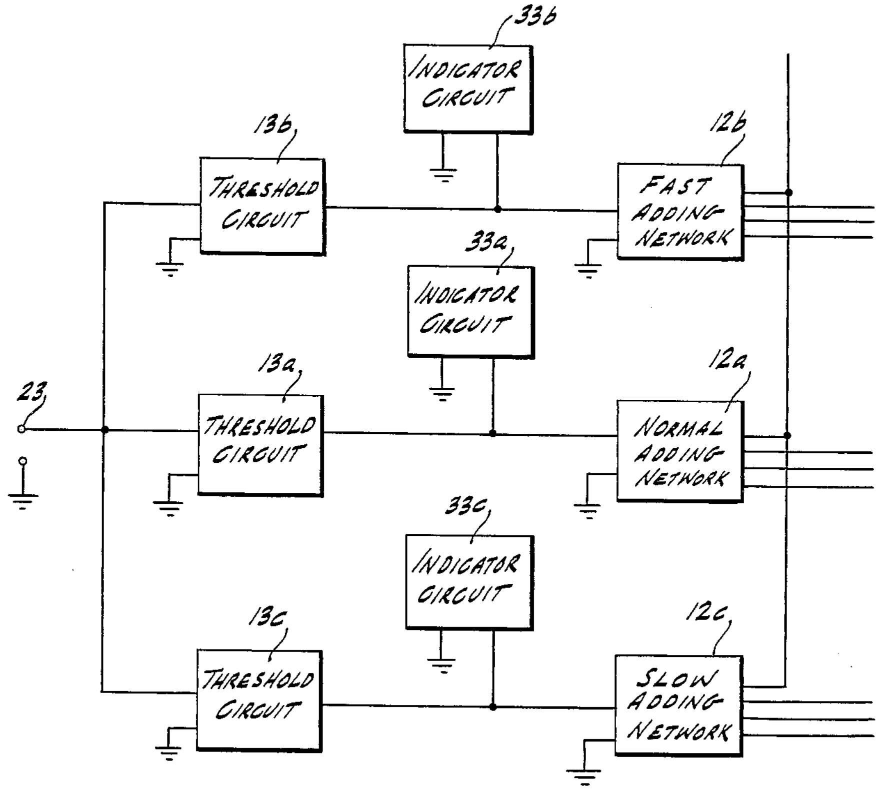
Figure 5:
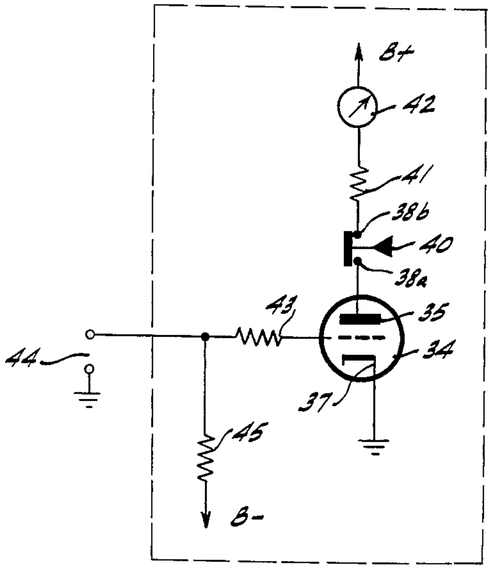

Fig. 4 is a block diagram of a portion of the recognition circuit of Fig. 1 that has been extended in accordance with the present invention for indicating the extent of any deviation in the time spacing between the individual pulses of the recognition signal applied to the recognition circuit; and Fig. 5 is a circuit diagram of one type of indicator circuit that may be used in the recognition circuit of Fig. 4.

Referring now to the drawings, there is shown in Fig. 1 a recognition circuit, according to the present invention, for producing an output recognition pulse in response to an identifying signal comprising $m$ time-spaced groups of $n$ time-spaced pulses, despite deviations in the time spacing between the individual pulses of the identifying signal from that of a predetermined time spacing between pulses. The recognition circuit comprises an input network 10 for superimposing corresponding pulses of the $m$ groups of pulses to produce a single group of $n$ time-spaced pulses of substantially equal amplitude and duration; a delay line 11 for delaying the single group of $n$ pulses and including three sets of $n$ output taps to simultaneously produce the delayed group of $n$ pulses at one of the sets of output taps; three adding networks **12*a*, 12*b*, 12*c*, one network for each set of taps, for combining the simultaneously produced group of $n$ pulses to produce a composite pulse whose amplitude is equal to the sum of the amplitudes of the $n$ pulses multiplied by a reduction factor; and a threshold circuit 13** which, in response to a predetermined minimum amplitude of the composite pulse, produces the output pulse. It should be mentioned that any number of sets of output taps and adding networks may be utilized in the recognition circuit, depending upon the degree of accuracy required of the recognition circuit. However, to facilitate the description of the recognition circuit and to avoid confusion, the delay line has been illustrated in Fig. 1 comprising only three sets of output taps and the number of adding networks has similarly been limited to three.

Input network 10 includes $m$ input terminals 14–1 to **14–*m* for receiving, respectively, the $m$ applied groups of pulses, $m$ limiter networks 15–1 to 15–*m*, one connected ot each input terminal, for limiting the amplitude of the applied pulses to a fixed voltage level, and an alignment circuit 16 connected to the output terminals of limiters 15–1 to 15–*m*** for superimposing the corresponding pulses of the $m$ applied groups of pulses, to produce the single group of $n$ time-spaced pulses previously mentioned. Examples of limiters that may be used are found on pages 158 through 169 of Radar Electronic Fundamentals, Technical Manual 11–466, published by the War Department in June 1944.

Figure 2:
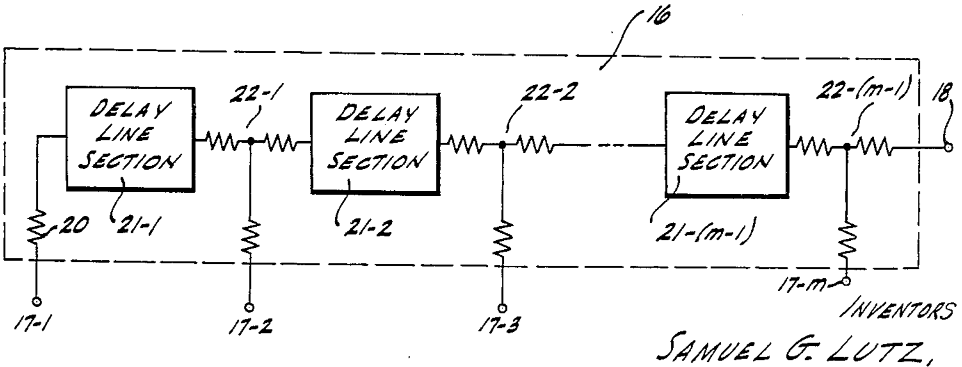
Fig. 2 is a circuit diagram, partly in block form, of one type of alignment circuit shown in Fig. 1.

One type of alignment network 16 is shown in detail in Fig. 2 and includes $m$ input terminals 17–1 to **17–*m* coupled to the output terminals of limiters 15–1 to 15–*m*, respectively, an output terminal 18, a matching resistor 20 connected at one end to input terminal 17–1, and ($m$–1 delay line sections 21–1 to 21–($m$–1) connected in tandem between the other end of resistor 20 and output terminal 18. The (X)th delay line section, where X is an integer from one through ($m$–1**), has a time delay equal to the time interval between the leading edge of a pulse in the (X)th group of pulses and the leading edge of a corresponding pulse in the ($X+1$)th group of pulses. An example of a delay line section that may be used is shown in Fig. 22.16 on page 746 of vol. 19 of the M.I.T. Radiation Laboratory Series, published in 1949 by the McGraw-Hill Book Company, Inc.

Delay line sections 21–1 to 21–($m$–1) are coupled to input terminals 17–2 to 17–$m$ through a plurality of T-pad attenuators 22–1 to 22–($m$–1), each T-pad attenuator except the last, namely, T-pad attenuator 22–($m$–1), being connected between an associated input terminal and the output and input ends connecting an associated pair of adjacent delay line sections. Instead, T-pad attenuator 22–($m$–1) is connected between input terminal 17–$m$ and the output end of delay line section 21–($m$–1) and output terminal 18. Resistor 20 and T-pad attenuators 22–1 to 22–($m$–1) match the various delay line sections to prevent reflections and have attenuation characteristics such that the group of $n$ time-spaced pulses produced by alignment circuit 16 at output terminal 18 are of substantially equal amplitude.

Delay line 11 is connected to the output end of input network 10, or, stated differently, to output terminal 18 of alignment circuit 16 as shown in Fig. 1, and is provided with a plurality of sets of $n$ output taps which, for the reasons previously mentioned, have been limited to three sets, the first set comprising taps 1, . . . ($n$–2), ($n$–1), $n$, the second set comprising taps 1', . . . ($n$–2)', ($n$–1)', $n'$, and the third set comprising taps 1'', . . . ($n$–2)'', ($n$–1)'', $n''$. The $n$ output taps of the first set 1, . . . ($n$–2), ($n$–1), $n$, are spaced from each other to simultaneously produce the $n$ delayed pulses having the predetermined time spacing between individual pulses and the $n$ output taps of each one of the other sets are spaced from each other to simultaneously produce the $n$ delayed pulses deviating in the time spacing between individual pulses from the predetermined time spacing.

More particularly, the $n$ output taps of the first set 1, . . . ($n$–2), ($n$–1), $n$, are spaced from each other in such a manner that the time delay of the delay line between the (Y)th output tap and the ($Y-1$)st output tap, where (Y) is an integer from 2 through $n$, is equal to the time interval between the leading edges of the ($n$–$Y$+1)st pulse and the ($n$–$Y$+2)nd pulse of the $n$ pulses having the predetermined time spacing between individual pulses, and the $n$ output taps of each one of the other sets are spaced from each other in such a manner that the time delay of the delay line between the (Y)th output tap and the ($Y-1$)st output tap is equal to ($1\pm k$) times the interval between the leading edges of the ($n$–$Y$+1)st pulse and the ($n$–$Y$+2)nd pulse of the $n$ pulses having the predetermined time spacing between individual pulses, where $k$ is a decimal percentage of the deviation from the predetermined time spacing.

Furthermore, with respect to the relationship between corresponding output taps of the different sets of output taps, the (Y)th output tap of the first set is spaced from the corresponding (Y)th output tap of each one of the other sets in such a manner that the time delay of the delay line between the (Y)th output tap of the first set and the (Y)th output tap of each one of the other sets is equal to $k$ times the time interval between the leading edges of the (1)st pulse and the (Y)th pulse of the $n$ pulses having the predetermined time spacing between individual pulses, where, as before, $k$ is a decimal percentage of the deviation from the predetermined time spacing.

Adding networks 12$a$, 12$b$ and 12$c$ are electrically connected to the three sets of $n$ output taps, one network to a set, normal adding network 12$a$ linearly adding the simultaneously produced group of pulses having the predetermined time spacing between individual pulses, and fast and slow adding networks 12$b$ and 12$c$ linearly adding the simultaneously produced groups of pulses having a time spacing between individual pulses that is less than and greater than the predetermined time spacing, respectively. Thus, adding network 12$a$ is connected to the first set of taps 1, . . . ($n$–21), ($n$–1), $n$, adding networks 12$b$ and 12$c$ being connected to the second and third sets of output taps 1', . . . ($n$–2)', ($n$–1)', $n'$, and 1'', . . . ($n$–2)'', ($n$–1)'', $n''$, respectively. Each one of adding networks 12$a$–12$c$ may be any conventional network for producing a composite pulse representing the sums of the pulses simultaneously produced at the output taps. More specifically, the composite pulse produced by adding network is equal in amplitude to the instantaneous sum of the amplitudes of the pulses simultaneously produced at the associated set of output taps multiplied by a reduction factor. In its simplest form, each adding network comprises a set of $n$ resistors connected between the associated set of $n$ output taps, one resistor to an output tap, and the output terminal of the adding network.

Threshold circuit 13 is electrically connected between an output terminal 23 and adding networks 12$a$–12$c$ and is biased to a predetermined voltage level a predetermined amount below the amplitude of the composite pulse produced in response to a predetermined minimum number of pulses of the single group of $n$ pulses applied to delay line 11. The composite pulse is applied to threshold circuit 13 which, in response to the portion of the output pulse exceeding the predetermined voltage level, produces an output pulse. A threshold circuit that may be used herein is illustrated in Fig. 9.3($c$) on page 329 of volume 19 of the M.I.T. Radiation Laboratory Series, published in 1949 by the McGraw-Hill Book Co., Inc.

Figure 3:
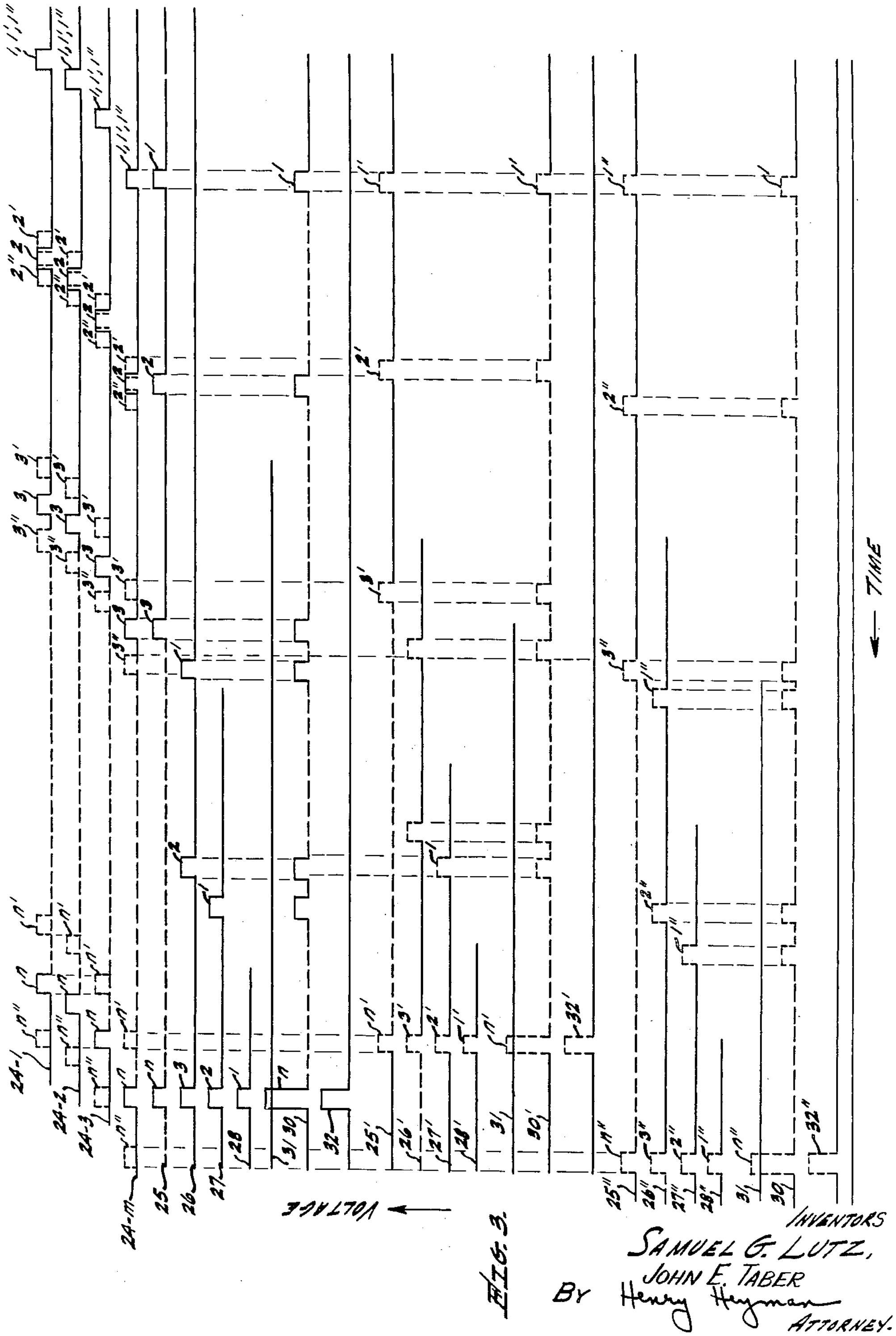
Fig. 3 is a composite diagram of waveforms representative of the signals produced at various points in the circuit of Fig. 1.

In operation, an identifying signal comprising $m$ time-spaced groups of $n$ time-spaced pulses of substantially equal amplitude and duration, as illustrated by pulses 1 to $n$ of waveforms 24–1 to 24–$m$ in Fig. 3, is applied to input terminals 14–1 to 14–$m$, one group to each terminal. The time spacing between individual pulses of any one group is predetermined and equal to the time spacing between corresponding pulses in any other group and the time spacing between corresponding pulses of any two groups is equal to the time spacing between any other corresponding pulses of the two groups. Thus, for example, the time spacing between pulses 1 and 2 of pulse group 24–1 is predetermined and equal to the time spacing between pulses 1 and 2 of pulse group 24–2. Furthermore, the time spacing pulses 1 of pulse groups 24–1 and 24–2 is equal to the time spacing between pulses 2 of pulse groups 24–1 and 24–2.

Pulses 1 to $n$ of pulse groups 24–1 to 24–$m$ are applied through limiter networks 15–1 to 15–$m$ to alignment circuit 16 which superimposes corresponding pulses of the $m$ applied groups of pulses to produce a single group of $n$ time-spaced pulses of substantially equal amplitude and duration, as illustrated by pulses 1 to $n$ of waveform 25 in Fig. 3. More specifically, pulse 1 of pulse group 24–1 applied to input terminal 14–1 is delayed by delay line section 21–1 for an interval of time equal to the time spacing between the leading edge of pulse 1 of group 24–1 and the leading edge of corresponding pulse 1 of group 24–2 subsequently applied to input terminal 14–2. Thus, corresponding pulses 1 of pulse groups 24–1 and 24–2 applied to terminals 14–1 and 14–2, respectively, are superimposed, the superimposed pulses being further delayed by delay line sections 21–2 to 21–($m$–1) to be superimposed upon corresponding pulses 1 of groups 24–3 to 24–$m$ subsequently applied to input terminals 14–3 to 14–$m$, thereby to produce pulse 1 of the $n$ time-spaced pulses of output pulse group 25 of alignment circuit 16. Corresponding pulses 2, 3, . . . n of the m applied groups of pulses are similarly superimposed in the manner just described to produce pulses 2, 3, . . . n of the n time-spaced pulses of pulse group 25.

The amplitudes of the corresponding pulses, in their successive stages of superpositon, are adjusted by T-pad attenuators 22–1 to 22–(m–1) so that the n pulses of pulse group 25 are substantially equal in amplitude. Furthermore, it will be obvious from the manner in which corresponding pulses of pulse groups 24–1 to 24–m have been superimposed that the time spacing between any two pulses of pulse group 25 is equal to the predetermined time spacing between the corresponding two pulses of any one of pulse groups 24–1 to 24–m. Thus, for example, the time spacing between pulses 1 and 2 of pulse group 25 is equal to the predetermined time spacing between pulses 1 and 2 of pulse groups 24–1 to 24–m.

The n time-spaced pulses of pulse group 25 are serially applied to delay line 11 which delays each pulse to simultaneously produce a group of n pulses at output taps 1, . . . (n–2), (n–1), n of the delay line, one pulse being produced at each tap, as partly shown by pulses n, 3, 2, 1 of waveforms 25, 26, 27, 28, respectively, in Fig. 3. In other words, pulse group 25 is delayed in such a manner that at the instant of time that pulse n of pulse group 25 is produced at delay line tap 1, pulse 3 of pulse group 26, pulse 2 of pulse group 27, and pulse 1 of pulse group 28 are developed at delay line taps (n–2), (n–1), and n, respectively. It should be noted that, for purposes of illustration, only a few of the n output taps of delay line 11 are shown in Fig. 1 and that only pertinent portions of the associated illustrative pulse groups are shown in Fig. 3. It will be recognized, therefore, that pulses n, 3, 2, 1 of pulse groups 25, 26, 27, 28, respectively, represent only a portion of the group of n pulses simultaneously produced at output taps 1 to n of delay line 11.

Pulse groups 25, 26, 27, 28 are applied to adding network 12a which, in response thereto, produces a group of composite pulses, indicated by waveform 30 in Fig. 3. More particularly, pulse groups 25, 26, 27, 28 are linearly added by adding circuit 12a to produce pulse group 30, the amplitude of each pulse of pulse group 30 being equal to the instantaneous sums of the amplitudes of the corresponding pulses of pulse groups 25, 26, 27, 28, multiplied by a reduction factor. Accordingly, pulse group 30 comprises a plurality of time-spaced pulses of varying amplitude, the amplitude of the nth pulse in the group having the greatest value and being proportional to the instantaneous sum of the amplitudes of the group of n pulses simultaneously produced at taps 1 to n of delay line 11, as represented by pulses n, 3, 2, 1 of pulse groups 25, 26, 27, 28, respectively.

Pulse group 30 is applied to threshold circuit 13 which is biased to a predetermined voltage level, as shown by voltage level 31 in Fig. 3. The threshold circuit is responsive to the portion of composite pulse n of pulse group 30 exceeding voltage level 31 to produce an output pulse 32 at output terminal 23, as shown in Fig. 3. By selecting a suitable voltage level 31 for biasing threshold circuit 13, an output pulse 32 will be produced at output terminal 23 only in response to a composite pulse n of pulse group 30 whose amplitude represents at least a predetermined minimum number of pulses of the n pulses of pulse group 25 applied to delay line 11.

It was previously mentioned that the recognition circuit of the present invention will produce an output recognition pulse in response to a received identifying signal despite deviations in the time spacing between the individual pulses of the signal from that of a predetermined time spacing between individual pulses. Accordingly, consider now the operation of the recognition circuit when pulses 1′ to n′ of pulse groups 24–1 to 24–m are applied to input terminals 14–1 to 14–m, respectively, the time spacing between any two pulses of pulses 1′ to n′ of any one pulse group being less than the predetermined time spacing between the corresponding two pulses of pulses 1 to n of the same pulse group by a fixed percentage factor. Pulses 1′ to n′ of pulse groups 24–1 to 24–m are limited by limiters 15–1 to 15–m and superimposed by alignment circuit 16 to produce pulse group 25′, in the same manner previously described in connection with pulse group 25. As a result, pulse group 25′ comprises n time-spaced pulses 1′ to n′ of substantially equal amplitude and duration, the time spacing between any two pulses of pulse group 25′ being equal to the time spacing between the corresponding two pulses of pulses 1′ to n′ of any one of pulse groups 24–1 to 24–m.

The n time-spaced pulses of pulse group 25′ are serially applied to delay line 11 which delays each pulse to simultaneously produce a group of n pulses at output taps 1′, . . . (n–2)′, (n–1)′, n′ of the delay line, one pulse being produced at each tap, as partly shown by pulses n′, 3′, 2′, 1′ of pulse groups 25′, 26′, 27′, 28′, respectively, in Fig. 3. Thus, for reasons previously advanced, pulses n′, 3′, 2′, 1′ of pulse groups 25′, 26′, 27′, 28′ are produced at delay line taps 1′, (n–2)′, (n–1)′, n′, respectively, at the same instant of time.

Pulse groups 25′, 26′, 27′, 28′ are applied to adding network 12b which, in response thereto, produces a group of composite pulses, as indicated by waveform 30′ in Fig. 3, the amplitude of each pulse of pulse group 30′ being equal to the instantaneous sums of the amplitudes of the corresponding pulses of pulse groups 25′, 26′, 27′, 28′, multiplied by the reduction factor. Accordingly, pulse group 30′ comprises a plurality of time-spaced pulses of varying amplitude, the amplitude of the n′th pulse in the group having the greatest value. Pulse group 30′ is applied to threshold circuit 13 which, as before, is biased to voltage level 31. Thus, in response to the portion of composite pulse n′ of pulse group 30′ that exceeds voltage level 31, threshold circuit 13 produces an output pulse 32′, as shown in Fig. 3, at output terminal 23.

Consider now the operation of the recognition circuit when pulse groups 24–1 to 24–m, each group comprising pulses 1″ to n″, are applied to input terminals 14–1 to 14–m, respectively, the time spacing between any two pulses of pulses 1″ to n″ of any one pulse group being greater by a fixed percentage factor than the predetermined time spacing between the corresponding two pulses of pulses 1 to n of the same pulse group. As previously explained, pulses 1″ to n″ of pulse groups 24–1 to 24–m are limited by limiter networks 15–1 to 15–m and superimposed by alignment circuit 16 to produce pulse group 25″ comprising time-spaced pulses 1″ to n″, as shown in Fig. 3. Pulse group 25″ is delayed by delay line 11 to simultaneously produce a group of n pulses at output taps 1″ to n″ of the delay line, one pulse being produced at each tap, as partly shown by pulses n″, 3″, 2″, 1″ of pulse groups 25″, 26″, 27″, 28″, respectively.

Pulse groups 25″, 26″, 27″ 28″ are applied to adding network 12c which, in response thereto, produces pulse group 30″ comprising composite pulses of varying amplitude, the n″th pulse in the group having the greatest amplitude. Pulse group 30″ is applied to threshold circuit 13 which is biased to voltage level 31 and, in response to the portion of composite pulse n″ exceeding voltage level 31, produces an output pulse 32″ at output terminal 23.

It was mentioned earlier that the recognition circuit of the present invention may be utilized to obtain an indication of the extent of any deviation and whether the deviation is positive or negative with respect to the predetermined time spacing between pulses. Such a result can be achieved by connecting the output terminals of adding networks 12a–12c both to three threshold circuits 13a–13c and to three indicator circuits 33a–33c, respectively, as shown in Fig. 4, the output terminals of threshold circuits 13*a*–13*c* being connected to output terminal 23 and the output terminals of indicator circuits 33*a*–33*c* being connected to ground.

One type of indicator circuit that may be utilized in the circuit of Fig. 4 is shown in Fig. 5 and comprises a thyratron 34 having an anode 35, a control grid 36 and a cathode 37. Anode 35 is connected directly to a pair of terminals **38*a* and 38*b* shorted by means of a reset button 40. Terminal 38*b* is connected through a resistor 41 and an ammeter 42 to a source of positive potential indicated as +B. Cathode 37 is grounded as shown and control grid 36 is connected through a resistor 43 to input terminals 44, one input terminal being grounded and the other input terminal being connected to resistor 43. The other input terminal is also connected through a resistor 45 to a source of negative potential indicated as −B which negatively biases thyratron 34** to normally maintain the thyratron non-conductive.

In considering the operation of the recognition circuit modified as shown in Fig. 4, assume initially that the time spacing between the individual pulses of pulse groups 24–1 to **24–*m*** applied to the recognition circuit is equal to the predetermined time spacing between individual pulses. Accordingly, when pulse *n* of pulse group 30 is applied to threshold circuit **13*a***, pulse *n* is also applied to indicator circuit **33*a*** which, in response thereto, is rendered operable. More particularly, referring to the indicator circuit of Fig. 5 for a better understanding of the operation of the indicator circuit, when pulse *n* of pulse group 30 is applied to input terminals 44 and from thence to control grid 36, thyratron 34 is triggered and commences to conduct current which flows from source B+ through ammeter 42, resistor 41 and thyratron 34 to ground. As a result, ammeter 42 registers a current flow which indicates to an observer that the time spacing between the individual pulses of pulse groups 24–1 to **24–*m* applied to the recognition circuit is the predetermined time spacing. To return the indicator circuit to its normally non-conducting state, reset button 40 is pushed, thereby disconnecting terminal 38*a* from terminal 38*b* and interrupting the flow of current through thyratron 34**.

Referring again to Fig. 4, in the event that the time spacing between the individual pulses of pulse groups 24–1 to **24–*m* is less than or greater than the predetermined time spacing, either indicator circuit 33*b* or 33*c*** will be rendered operable as previously described, thereby to indicate to the observer the extent of the deviation and whether such deviation is positive or negative with respect to the predetermined time spacing.

What is claimed as new is:

1. A recognition circuit for producing an output pulse in response to at least a predetermined minimum number of pulses of an applied group of time-spaced pulses of substantially equal amplitude and duration, said circuit being arranged to produce an output pulse despite deviations in the time spacing between the individual pulses from a predetermined time spacing between individual pulses, said circuit comprising: means for simultaneously producing the applied group of time-spaced pulses at an instant of time, an applied group of pulses having the predetermined time spacing between individual pulses being simultaneously produced at a first instant of time and an applied group of pulses having other than the predetermined time spacing between individual pulses being simultaneously produced at another instant of time, the time interval between said other and said first instants of time corresponding to the product of the time interval between the first and last pulses of the applied group of pulses and the percentage deviation of the time spacing between individual pulses from that of the predetermined time spacing between individual pulses; a plurality of adding networks electrically connected to said means and operable in response to said simultaneously produced group of pulses to produce a composite pulse representative of said simultaneously produced group of pulses, one of said plurality of adding networks producing a composite pulse in response to said group of pulses simultaneously produced at said first instant of time and another one of said plurality of adding networks producing a composite pulse in response to said group of pulses simultaneously produced at said other instant of time; and threshold means electrically connected to said plurality of adding networks and responsive to the portion of said composite pulse exceeding a predetermined voltage level for producing an output pulse, said predetermined voltage level being a predetermined amount below the amplitude of the initial pulse produced in response to the predetermined minimum number of pulses.

2. A recognition circuit for producing an output pulse in response to at least a predetermined minimum number of pulses of an applied group of time-spaced pulses of substantially equal amplitude and duration, said circuit being arranged to produce an output pulse despite deviations in the time spacing between the individual pulses from a predetermined time spacing between individual pulses, said circuit comprising: means for delaying the applied group of pulses, said means including a plurality of sets of output circuits for simultaneously producing a delayed group of pulses at an instant of time, said sets of output circuits including one set for simultaneously producing the delayed group of pulses having the predetermined time spacing between individual pulses and additional sets for simultaneously producing the delayed group of pulses deviating in the time spacing between individual pulses from the predetermined time spacing; a plurality of adding networks, each being electrically connected to a different one of said plurality of sets of output circuits, each of said adding networks being operable in response to the delayed group of pulses simultaneously produced at the associated set of output circuits to produce an initial pulse representative of said delayed group of pulses, the amplitude of said initial pulse corresponding to the sum of the amplitudes of the delayed group of pulses multiplied by a reduction factor; and threshold means electrically connected to said plurality of adding networks and responsive to the portion of the initial pulse exceeding a predetermined voltage level for producing an output pulse, said predetermined voltage level being a predetermined amount below the amplitude of the initial pulse produced in response to the predetermined minimum number of pulses.

3. A recognition circuit for producing an output pulse in response to at least a predetermined minimum number of pulses of *n* serially applied pulses of substantially equal amplitude and duration, said circuit being arranged to produce an output pulse despite deviations in the time spacing between the individual pulses of the *n* applied pulses from a predetermined time spacing between individual pulses, said circuit comprising: means for delaying each of the *n* serially applied pulses; a plurality of sets of *n* output circuits electrically connected to said means for simultaneously producing *n* delayed pulses at an instant of time, the *n* output circuits of one set being spaced from each other to simultaneously produce the *n* delayed pulses having the predetermined time spacing between individual pulses and the *n* output circuits of each one of the other sets being spaced from each other to simultaneously produce the *n* delayed pulses deviating in time spacing between individual pulses from the predetermined time spacing; a plurality of adding networks, each being electrically connected to a different one of said plurality of sets of output circuits, each of said adding networks being operable in response to the *n* delayed pulses simultaneously produced at the associated set of output circuits to produce an initial pulse representative of the *n* delayed pulses, the amplitude of said initial pulse corresponding to the sum of the amplitudes of the *n* delayed group of pluses, multiplied by a reduction factor; and threshold means electrically connected to said plurality of adding networks and responsive to the portion of the initial pulse exceeding a predetermined voltage level for producing an output pulse, said predetermined voltage level being a predetermined amount below the amplitude of the initial pulse produced in response to the predetermined minimum number of pulses.

4. A recognition circuit for producing an output pulse in response to the application of $m$ time-spaced groups of $n$ time-spaced pulses of substantially equal amplitude and duration, the time interval between pulses of any one group being equal to the time interval between corresponding pulses in any other group and the time interval between corresponding pulses of any two groups being equal to the time interval between any other corresponding pulses of the two groups, said circuit being arranged to produce an output pulse despite corresponding deviations in the time spacing between the $n$ individual pulses of each of the $m$ groups from that of a predetermined time spacing, said circuit comprising: alignment means for superimposing corresponding pulses of the $m$ applied groups of pulses to produce an output group of $n$ time-spaced pulses of substantially equal amplitude and duration, the time spacing between the $n$ individual pulses of the output group of pulses being equal to the time spacing between the $n$ individual pulses of each of the $m$ applied groups of pulses; delay means for delaying the output group of $n$ time-spaced pulses; a plurality of sets of $n$ output circuits electrically connected to said delay means for simultaneously producing a delayed output group of $n$ pulses at an instant of time, the $n$ output circuits of one set being spaced from each other to simultaneously produce the delayed output group of $n$ pulses having the predetermined time spacing between individual pulses, and the $n$ output circuits of each one of the other sets being spaced from each other to simultaneously produce the delayed output group of $n$ pulses deviating in the time spacing between individual pulses from the predetermined time spacing; a plurality of adding networks, each being electrically connected to a different one of said plurality of sets of output circuits, each of said adding networks being operable in response to the delayed output group of $n$ pulses simultaneously produced at the associated set of $n$ output circuits to produce a composite pulse representative of said delayed output group of $n$ pulses, the amplitude of said composite pulse corresponding to the sum of the amplitudes of the delayed output group of $n$ pulses multiplied by a reduction factor; and threshold means electrically connected to said plurality of adding networks and biased to a voltage level a predetermined amount below the amplitude of the composite pulse produced in response to the predetermined minimum number of pulses, said threshold means being responsive to the portion of said composite pulse exceeding said voltage level for producing an output pulse.

5. The recognition circuit defined in claim 4 wherein said alignment means includes $(m-1)$ delay line sections connected in tandem for superimposing corresponding pulses of the $m$ applied groups of pulses to produce said output group of $n$ time-spaced pulses, the (X)th section, where X is an integer from 1 through $(m-1)$, having a time delay equal to the time interval between the leading edge of a pulse in the (X)th group of pulses and the leading edge of a corresponding pulse in the $(X+1)$st group of pulses.

6. The recognition circuit defined in claim 3 wherein the $n$ output circuits of said one set are spaced from each other in such a manner that the time delay of said means between the (Y)th output circuit and the $(Y-1)$st output circuit, where (Y) is an integer from 2 through $n$, is equal to the time interval between the leading edges of the $(n-Y+1)$st pulse and the $(n-Y+2)$nd pulse of the $n$ pulses having the predetermined time spacing between individual pulses, and the $n$ output circuits of each one of said other sets are spaced from each other in such a manner that the time delay of said means between the (Y)th output circuit and the $(Y-1)$st output circuit is equal to $(1 \pm k)$ times the time interval between the leading edges of the $(n-Y+1)$st pulse and the $(n-Y+2)$nd pulse of the $n$ pulses having the predetermined time spacing between individual pulses, where $k$ is a decimal percentage of the deviation from the predetermined time spacing.

7. The recognition circuit defined in claim 3 wherein the $n$ output circuits of said one set are spaced from each other in such a manner that the time delay of said means between the (Y)th output circuit and the $(Y-1)$st output circuit, where (Y) is an integer from 2 through $n$, is equal to the time interval between the leading edges of the $(n-Y+1)$st pulse and the $(n-Y+2)$nd pulse of the $n$ pulses having the predetermined time spacing between individual pulses, and the (Y)th output circuit of each one of said other sets is spaced from the corresponding (Y)th output circuit of said one set in such a manner that the time delay of said means between the (Y)th output circuit of each one of said other sets and the (Y)th output circuit of said one set is equal to $k$ times the time interval between the leading edges of the (1)st pulse and the (Y)th pulse of the $n$ pulses having the predetermined time spacing between individual pulses, where $k$ is a decimal percentage of the deviation from the predetermined time spacing.

8. A recognition circuit for producing an output pulse in response to at least a predetermined minimum number of pulses of an applied group of time-spaced pulses of substantially equal amplitude and duration, said circuit producing an output pulse despite deviations in the time spacing between the individual pulses from that of a predetermined time spacing between individual pulses, said circuit comprising: a delay line for delaying the applied group of pulses, said delay line including a plurality of sets of output taps for simultaneously producing a delayed group of pulses at an instant of time, said sets of output taps including one set for simultaneously producing the delayed group of pulses having the predetermined time spacing between individual pulses and additional sets for simultaneously producing the delayed group of pulses deviating in the time spacing between individual pulses from the predetermined time spacing; a plurality of adding networks, each being electrically connected to a different one of said plurality of sets of output taps, each of said adding networks being operable in response to the delayed group of pulses simultaneously produced at the associated set of output taps to produce a composite pulse representative of said delayed group of pulses, the amplitude of said composite pulse corresponding to the sum of the amplitudes of the delayed group of pulses multiplied by a reduction factor; and threshold means electrically connected to said plurality of adding networks and responsive to the portion of said composite pulse exceeding a predetermined voltage level for producing an output pulse, said predetermined voltage level being a predetermined amount below the amplitude of said composite pulse produced in response to the predetermined minimum number of pulses.

No references cited.